(12) United States Patent
Mukai et al.

(10) Patent No.: US 7,218,989 B2
(45) Date of Patent: May 15, 2007

(54) MACHINE TOOL CONTROL APPARATUS

(75) Inventors: Yasuharu Mukai, Kariya (JP); Yoshiji Yamamoto, Toyohashi (JP); Yasunori Ban, Hashima (JP); Toshio Aono, Chiryu (JP); Shigeo Ohishi, Anjo (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 11/233,095

(22) Filed: Sep. 23, 2005

(65) Prior Publication Data

US 2006/0074514 A1    Apr. 6, 2006

(30) Foreign Application Priority Data

Oct. 4, 2004    (JP)    ............................. 2004-291621

(51) Int. Cl.
*G06F 19/00*    (2006.01)

(52) U.S. Cl. .................. 700/177; 700/18; 700/30; 700/174; 700/180; 700/182

(58) Field of Classification Search ................. 700/18, 700/30, 174, 177, 180, 182
See application file for complete search history.

(56) References Cited

U.S. PATENT DOCUMENTS

| | | | |
|---|---|---|---|
| 4,616,307 A | | 10/1986 | Kusumi et al. |
| 4,967,189 A | | 10/1990 | Sumita et al. |
| 5,453,933 A | * | 9/1995 | Wright et al. ............... 700/181 |
| 5,886,897 A | * | 3/1999 | Hazama et al. ............. 700/182 |
| 5,991,528 A | * | 11/1999 | Taylor et al. .................. 703/6 |
| 6,618,856 B2 | * | 9/2003 | Coburn et al. .............. 717/135 |

FOREIGN PATENT DOCUMENTS

| | | |
|---|---|---|
| EP | 1 308 806 A1 | 5/2003 |
| JP | 62-17805 | 1/1987 |
| JP | 7-84615 | 3/1995 |
| JP | 7-84616 | 3/1995 |
| JP | 2003-50608 | 2/2003 |

* cited by examiner

*Primary Examiner*—Michael D. Masinick
(74) *Attorney, Agent, or Firm*—Oblon, Spivak, McClelland, Maier & Neustadt, P.C.

(57) ABSTRACT

The control section can determine, on the basis of a detection signal from a detection device, whether operation of an element corresponding to the detection device has completed. The display device can display step sequence data and a three-dimensional model of a machine tool operated through simulation. When the abnormality detection section detects an abnormality of the machine tool, the control section extracts, from a ladder circuit corresponding to a step in which an abnormality has been detected, an element to be operated in response to completion of operation of a preceding element in the ladder circuit, or an element not having completed its operation. The control section then specifies a detection device corresponding to the extracted element or a moving part corresponding to the detection device, and displays the element or the moving part in the displayed three-dimensional model in a distinguishable manner.

2 Claims, 7 Drawing Sheets

PARTS DATA

*66A*

| PARTS | | MOVING DIRECTION | INITIAL COORDINATES | | | 3D SHAPE FILE NAME |
|---|---|---|---|---|---|---|
| ID | NAME | | X | Y | Z | |
| : | : | : | : | : | : | : |
| X004 | PROXIMITY SWITCH | - | 100 | 200 | 150 | FX004 |
| V001 | HYDRAULIC VALVE | - | 100 | 150 | 150 | FV001 |
| C001 | LEFT CHUCK | ROTATE IN PARALLEL AXIS WITH X AXIS | 100 | 250 | 150 | FC001 |
| W001 | WORK-PIECE | ROTATE IN PARALLEL AXIS WITH X AXIS | 300 | 200 | 1000 | FW001 |
| M001 | SPINDLE MOTOR | ROTATE IN PARALLEL AXIS WITH X AXIS | 50 | 100 | 150 | FM001 |
| : | : | : | : | : | : | : |

Fig. 4(a)

MOVING PARTS RELEVANT DATA

*66B*

| MOVING PARTS | OPERATION START CONDITIONS OF MOVING PARTS | | CONVERTED COORDINATES FOR STATE | | |
|---|---|---|---|---|---|
| ID | ID | STATE | X | Y | Z |
| : | : | : | : | : | : |
| C001 | V001 | START OF HYDRAULIC PRESSURE SUPPLY | +10deg/sec | 200 | 1000 |
| W001 | M001 | EVERY PULSE INPUT | +10deg | - | - |
| : | : | : | : | : | : |

Fig. 4(b)

RELEVANT LADDAR DATA

*66C*

| STEP NAME | RELEVANT LADDER CIRCUIT(1) | RELEVANT LADDER CIRCUIT(2) | ... |
|---|---|---|---|
| : | : | : | ... |
| LEFT CHUCK CLOSING | RD001 | RD002 | ... |
| : | : | : | ... |

MACHINE TOOL CONTROL APPARATUS

BACKGROUND OF THE INVENTION

1. Field of the Invention

The present invention relates to a machine tool control apparatus for controlling a machine tool; in particular, a machine tool equipped with a numerical controller and a safety device, etc. provided around the machine tool.

2. Description of the Related Art

Conventionally, a machine tool is provided with a numerical controller for controlling operation of the machine tool, and an operation panel including instruction input means and display means. The machine tool is configured to enable input of operation instruction from the operation panel and display of an abnormal condition on the operation panel.

In a conventional machine tool, an abnormal condition is typically displayed in the form of character data (including numerals). For example, when an abnormality occurs in a sensor A, a message "Sensor A is Abnormal" or an error code "123" is displayed. However, in the case where a workpiece is mounted on a jig with a slight positional deviation from the correct position, the machine tool may stop without displaying occurrence of an abnormality (hereinafter, such an abnormality will be referred to as "clam-up stop abnormality"). In such a case, even a skilled operator encounters difficulty in specifying a cause of stoppage of the machine tool.

Figure 5:
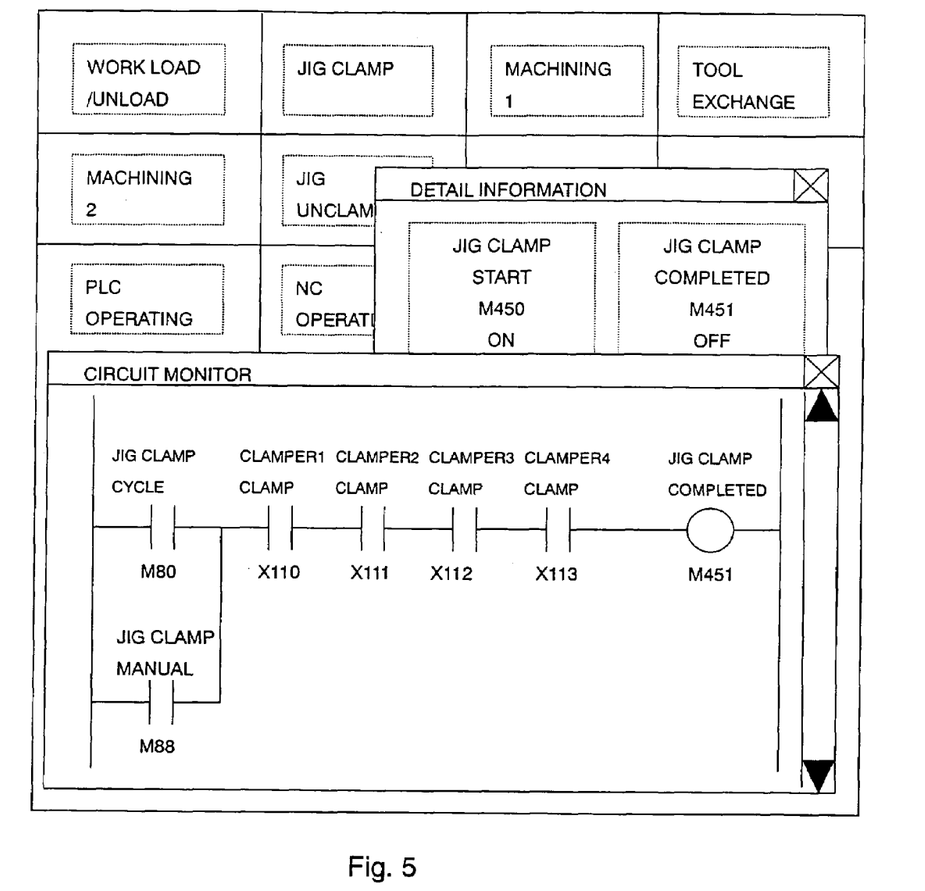
FIG. 5 is a diagram showing an example display of a conventional facility monitor.

In view of a foregoing, there has been proposed a facility monitor apparatus which displays on a touch-switch-type display unit a screen as shown in FIG. 5 (a ladder circuit corresponding to a step in which an abnormality has occurred (a circuit diagram showing the operation sequence of the step and the completion condition of the step)) when a machine tool has stopped because of occurrence of an abnormality (including clam-up stop abnormality), to thereby facilitate the operator's work for specifying the cause of the abnormality (see Japanese Patent Application Laid-Open (kokai) No. 2003-122427).

In recent years, an increasing number of companies have started operations in foreign countries where production cost is low so as to manufacture products or parts with high price competitiveness. In such a case, in general, skilled workers cannot be recruited in such foreign countries. Further, even in Japan, the number of skilled workers having mastered high-level techniques has decreased, and an increasing number of unskilled workers such as outsource workers tend to be found in production sites.

Although the conventional machine tool typically reports occurrence of an abnormality by use of "character data," this is insufficient for unskilled workers. For example, even when a message "Sensor A is Abnormal" is displayed, an unskilled worker cannot cope with the abnormality, because he or she may not know the location where the sensor A is mounted to the machine tool. Further, even when the mounting position of the sensor A is found, the unskilled worker may not know how to repair or replace the sensor A. Moreover, when a clam-up abnormality has occurred, a very long time may be required to specify the cause of the abnormality, and a very long time may be required to resume the operation.

The conventional technique disclosed in the above-mentioned publication suffers the same problem as the conventional machine tool in that an unskilled worker may be unable to find the mounting location of a part (sensor A in the above-described example), which is the cause of an abnormality, and the unskilled worker may not know the steps of repairing or replacing the part. However, in the case of a clam-up abnormality, the disclosed technique facilitates the work of specifying the cause of an abnormality.

Specifically, in the case of a clam-up abnormality, a ladder circuit corresponding to a step in which the machine tool has stopped is displayed, thereby enabling the unskilled worker to successively investigate or check moving parts each corresponding to a sensor, switch, or the like contained in the ladder circuit. Since the range of investigation is automatically narrowed, the cause of an abnormality can be easily specified.

In the case of a ladder circuit as simple as the example shown in FIG. 5 (having six or so elements), sequentially investigating the displayed elements does not require a considerably long time. However, in the case where a worker or operator does not know the locations of moving parts corresponding to the elements to be investigated and/or the worker or operator does not know the shapes of the moving parts, sequentially investigating the moving parts may take a considerably long time.

SUMMARY OF THE INVENTION

In view of the foregoing, an object of the present invention is to provide a machine tool control apparatus which can improve work efficiency. Another object of the present invention is to provide a machine tool control apparatus which enables an operator to more easily specify a cause of abnormal stoppage of a machine tool and to more easily perform work for recovering from the abnormal state.

In order to achieve the object, the present invention provides a machine tool control apparatus comprising control means for controlling the machine tool, simulation means capable of operating a three-dimensional model of the machine tool in synchronism with operation of the controlled machine tool, display means, storage means, and abnormality detection means.

The machine tool includes a plurality of moving parts each provided with a detection means for detecting the operation state of the moving part.

The storage means stores step sequence data representing the sequence of operation steps; ladder circuits related to the steps; and moving parts relevant data which relate each detection means to a moving part whose operation state is detected by the detection means. Each of the ladder circuits is configured by connecting elements, including the detection means, in series and/or parallel.

The control means controls the machine tool in a sequence according to the step sequence data and the ladder circuits. The control means can determine on the basis of a detection signal from each detection means whether an element corresponding to the detection means has completed its operation. The display means can display at least the three-dimensional model of the machine tool operated through simulation, and the step sequence data.

When the abnormality detection means detects an abnormality of the machine tool, the control means extracts, from a ladder circuit corresponding to a step in which an abnormality has been detected, an element to be operated in response to completion of operation of a preceding element in the ladder circuit, or an element not having completed its operation; specifies a detection means corresponding to the extracted element or a moving part corresponding to the detection means; and displays at least one of the specified detection means or moving part in the three-dimensional model displayed on the display means such that the detection means or moving part can be distinguished.

Therefore, by viewing the three-dimensional model displayed on the display means, an operator can instantaneously grasp the mounting position, shape, etc. of a detection means or a moving part corresponding to the detection means, which detection means or moving part is presumed to be the cause of an abnormality. Therefore, investigation for specifying the cause of the abnormality can be easily performed. Thus, the operator can easily perform work for recovering from the abnormal state.

Preferably, when the abnormality detection means detects an abnormality of the machine tool, the control means selects, on the basis of the step sequence data, a step in which an abnormality has been detected; displays a ladder circuit corresponding to the selected step; and displays, in the displayed ladder circuit, an element having completed its operation or an element not having completed its operation in a distinguishable manner.

In this case, a ladder circuit which shows the specific operation in the step in which an abnormality has been detected is automatically displayed on the display means. By virtue of this, the operator can grasp more precisely which element (i.e., moving part) must complete its operation normally (serves as a condition for completing the relevant step).

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
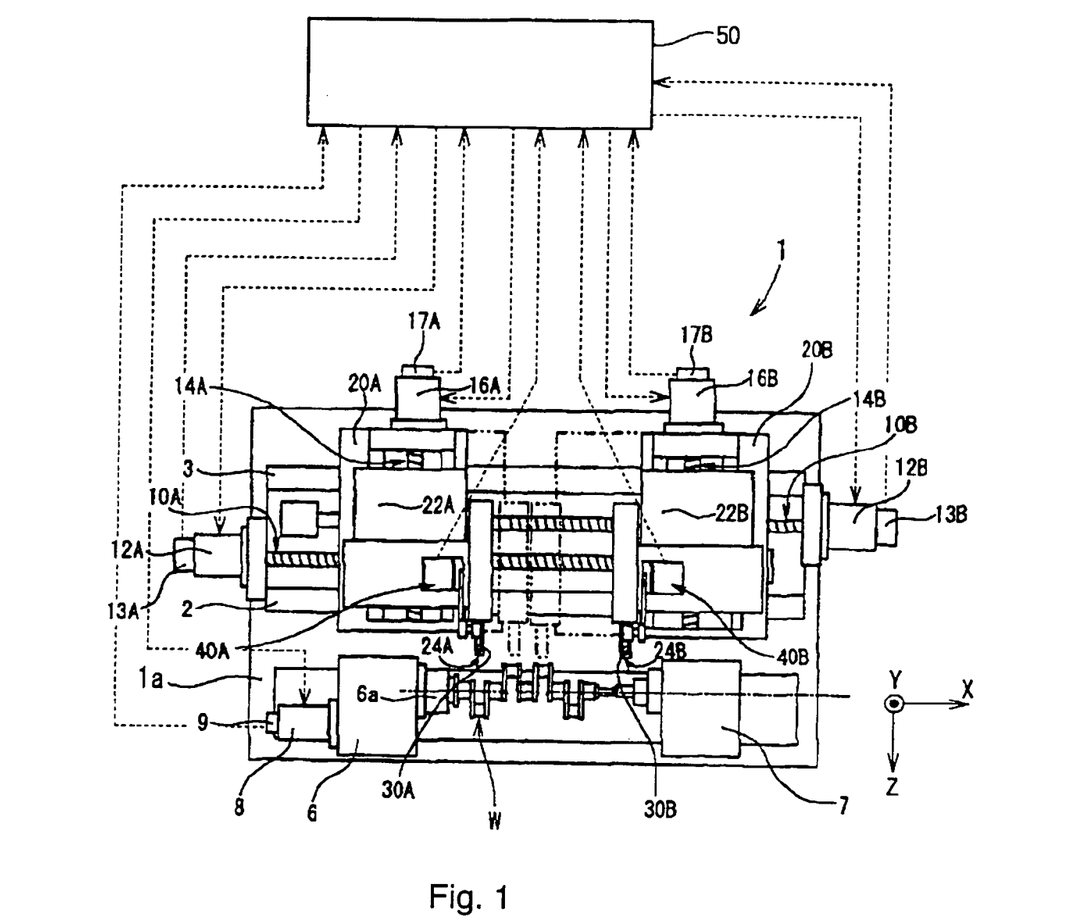
FIG. 1 is a view showing an example machine tool controlled by a machine tool control apparatus according to the present invention.

An embodiment of the present invention will be described with reference to the drawings. FIG. 1 shows an example machine tool equipped with a machine tool control apparatus 50 according to the present invention.

In the following, unless otherwise specified, the term "machine tool" encompasses a machine tool (machine tool body) itself and peripheral devices such as safety devices provided around the machine tool.

The present invention is directed to the machine tool control apparatus 50, and the machine tool and the peripheral devices (safety devices, etc.) are the same as conventional ones. The machine tool control apparatus 50 according to the present invention includes control means for controlling the machine tool (including peripheral devices). The machine tool control apparatus 50 can display a three-dimensional model of the machine tool operated, through simulation, in synchronism with operation of the controlled machine tool, and also displays a cycle diagram showing the sequence of operation steps of the machine tool. When the machine tool stops as a result of occurrence of an abnormality in a certain step, a moving part (a part which is mounted on the machine tool and which is to be operated in the step) which is presumed to be a cause of the abnormality is distinguishably displayed (highlighted) in the displayed three-dimensional model.

[Configuration of the Machine Tool (FIG. 1)]

FIG. 1 shows a machine tool body 1 (plan view) and the machine tool control apparatus 50 connected thereto. In the present embodiment, the machine tool is a crankshaft grinder for grinding and finishing a crankshaft of a vehicle. However, the machine tool is not limited thereto. In FIG. 1, X, Y, and Z axes perpendicularly intersecting one another are set such that the X axis extends horizontally and parallel to a rotation axis of a workpiece W, the Y-axis extends vertically (along a direction perpendicular to the sheet of FIG. 1), and the Z axis extends horizontally and perpendicular to the rotation axis of the workpiece W.

A V-shaped guide way 2 and a flat guide way 3, both extending along the longitudinal direction (X-axis direction), are provided on a bed 1a. A left-hand table 20A carrying a grinding wheel head (first wheel head) 22A is disposed on the V-shaped guide way 2 and the flat guide way 3 such that the left-hand table 20A can be slid along the X-axis direction by means of a feed screw 10A. Similarly, a right-hand table 20B carrying a super-finishing wheel head (second wheel head) 22B is disposed on the V-shaped guide way 2 and the flat guide way 3 such that the right-hand table 20B can be slid along the X-axis direction by means of a feed screw 10B. The V-shaped guide way 2 and the flat guide way 3 constitute rails for guiding the grinding wheel head 22A and the super-finishing wheel head 22B along the X-axis direction.

The grinding wheel head 22A, rotatably supporting a grinding wheel 24A (first machining means), and the super-finishing wheel head 22B, rotatably supporting a super-finishing wheel 24B (second machining means), are disposed on the left-hand and right-hand tables 20A and 20B, respectively, such that the grinding wheel head 22A and the super-finishing wheel head 22B can be slid by means of respective feed screws 14A and 14B along the front-rear direction (Z-axis direction) perpendicular to the X-axis direction.

A headstock 6 and a tailstock 7 are disposed in front of the grinding wheel head 22A and the super-finishing wheel head 22B while being separated from each other along the X-axis direction. The headstock 6 supports one end of the workpiece (a crankshaft in the present embodiment) W by means of a chuck 6a. The tailstock 7 presses and supports the opposite end of the workpiece W. A spindle servomotor 8 for rotating the workpiece W is provided on the headstock 6. The rotational position of the workpiece W is detected by means of an encoder 9 provided at the rear end of the spindle servomotor 8.

A servomotor 12A equipped with an encoder 13A is connected to a left end portion of the feed screw 10A for moving along the X-axis direction the left-hand table 20A carrying the grinding wheel head 22A. Similarly, a servomotor 12B equipped with an encoder 13B is connected to a right end portion of the feed screw 10A for moving along the X-axis direction the right-hand table 20B carrying the super-finishing wheel head 22B.

A servomotor 16A equipped with an encoder 17A and a servomotor 16B equipped with an encoder 17B are mounted on the left-hand table 20A and the right-hand table 20B, respectively, and are connected to respective end portions of the feed screws 14A and 14B for moving the wheel heads 22A and 22B, respectively, along the Z-axis direction.

A motor for rotating the grinding wheel 24A and a motor for rotating the super-finishing wheel 24B are disposed inside the wheel heads 22A and 22B, respectively.

The diameter (machining size) of one portion of the workpiece W ground by the grinding wheel 24A is measured by means of a measurement head 30A of a left-hand sizing device 40A. When the portion is ground to a final machining size, the plunge advancement of the grinding wheel head 22A is stopped.

Similarly, the diameter (machining size) of another portion of the workpiece W ground by the super-finishing wheel 24B is measured by means of a measurement head 30B of a right-hand sizing device 40B. When the portion is ground to a final machining size, the plunge advancement of the grinding wheel head 22B is stopped.

The machine tool control apparatus 50 receives detection signals from the encoders 13A, 13B, 17A, 17B, and 9, and the sizing devices 40A and 40B, and outputs control signals to the motors 12A, 12B, 16A, 16B, and 8 to thereby control the machine tool. Although not shown in the drawings, the machine tool is provided with various types of peripheral devices for securing safety of an operator, such as a safety cover, an emergency stop lamp, and a warning lamp. The machine tool control apparatus 50 also controls input of signals from these peripheral devices and output of signals to these peripheral devices.

As described above, the machine tool control apparatus 50 according to the present invention includes control means for controlling the machine tool. Further, in order to enable an unskilled worker or operator to easily operate the machine tool, the machine tool control apparatus 50 includes simulation means capable of operating a three-dimensional model of the machine tool in synchronism with operation of the machine tool, and display means for displaying the three-dimensional model of the machine tool undergoing simulated operation.

For example, the machine tool control apparatus 50 is formed of a personal computer (hereinafter referred to as "PC"). The machine tool control apparatus 50 includes an interface board (NC board, etc.) for inputting signals from the machine tool and outputting signals thereto, an interface board (PLC board, etc.) for inputting signals from the peripheral devices and outputting signals thereto, a control program (these boards and program correspond to the control means); a simulation program and data necessary for simulation (simulation means); and a graphic board and a monitor (display means).

[Block Diagram of the Machine Tool Control Apparatus (FIG. 2)]

Figure 2:
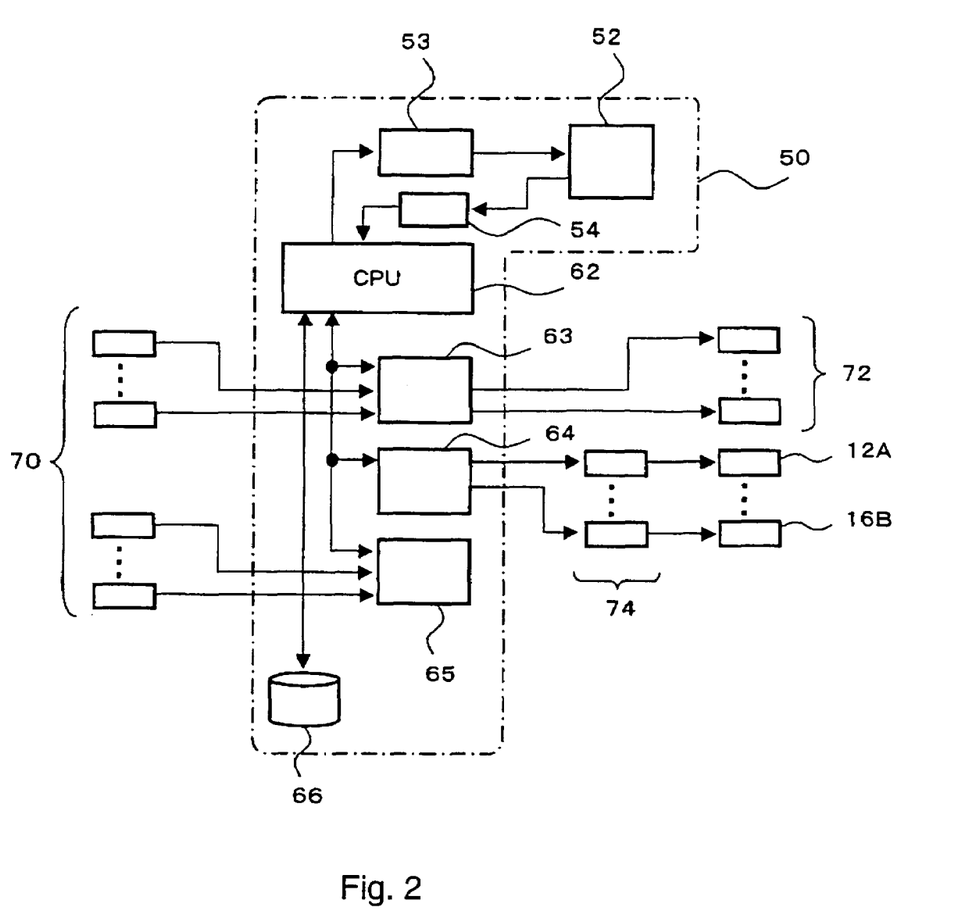
FIG. 2 is a block diagram of the machine tool control apparatus according to the present invention.

Next, the hardware configuration of the machine tool control apparatus 50 will be described with reference to FIG. 2.

The machine tool control apparatus 50 (the hardware of the machine tool control apparatus 50) is composed of a CPU 62, a PLC board 63, an NC board (for output) 64, an NC board (for input) 65, storage means 66 (hard disk drive, etc.), a monitor 52, a graphic board 53, and a communication interface 54 (hereinafter, "interface" will be referred to as "I/F"). Of the hardware, the CPU 62, the PLC board 63, the NC board (for output) 64, and the NC board (for input) 65 correspond to the control means of the machine tool.

The storage means 66 stores a cycle diagram (see section 52B of FIG. 3) showing the sequence of steps of the machine tool. For each step in the cycle diagram, a ladder circuit (see section 52A of FIG. 3) showing the specific operation in the step is stored while being related to the step.

The storage means 66 also stores a program and data for controlling the machine tool (numerical controller of the machine tool body 1 and control of the peripheral devices) in a sequence according to the cycle diagram or the ladder circuit; a simulation program and data for operating the three-dimensional model; and a program for detecting abnormality.

The machine tool control apparatus 50 of the present embodiment is configured such that the operation of the machine tool control apparatus 50 is totally controlled by use of a single CPU (CPU 62). Notably, each constituent element (graphic board 53, PLC board 63, etc.) may contain a dedicated CPU for controlling the constituent element itself and for exchanging data between the constituent element and the CPU 62.

When the CPU 62 detects activation of a start switch by an operator (by use of detection means 70), the CPU 62 starts the control of the machine tool in a sequence in accordance with a cycle diagram or a ladder circuit.

The machine tool includes a plurality of moving parts, and the detection means 70 (limit switch, etc.) is provided for each moving part in order to detect the operation state thereof.

The CPU 62 fetches detection signals output from the detection means 70 via the PLC board 63 or the NC board (for input) 65, determines the next operation in accordance with the cycle diagram or the ladder circuit, and outputs control signals via the PLC board 63 to an actuator 72 for driving moving parts and outputs control signals via the NC board (for output) 64 to servo amplifiers 74 for driving the servomotors 12A to 16B, etc. of the machine tool body 1.

The monitor 52 is of a touch-panel type. An instruction produced (or selected) as a result of the operator touching a certain portion of the monitor 52 is fed to the CPU 62 via the communication I/F 54. Notably, when the monitor 52 is not a touch panel type, a keyboard, a mouse, or the like is connected to the CPU 62 so as to enable the operator to input an instruction.

[Example Display of the Monitor and Example Display at the Time of Occurrence of an Abnormality (FIG. 3)]

Next, an example display of the monitor 52 will be described with reference to FIG. 3. In the example shown in FIG. 3, the entire screen is divided into four sections. Step sequence data (cycle diagram in this example) is displayed in the upper right section (52B). A ladder circuit is displayed in the upper left section (52A). A three-dimensional model is displayed in the lower right section (52D). Coordinates of main moving parts (e.g., coordinates of the grinding wheel 24A) are displayed in the lower left section (52C) in the form of numerical values. Although the step sequence data is not limited to the cycle diagram, the case in which the step sequence data is in the form of a cycle diagram will be described below.

Figure 3:
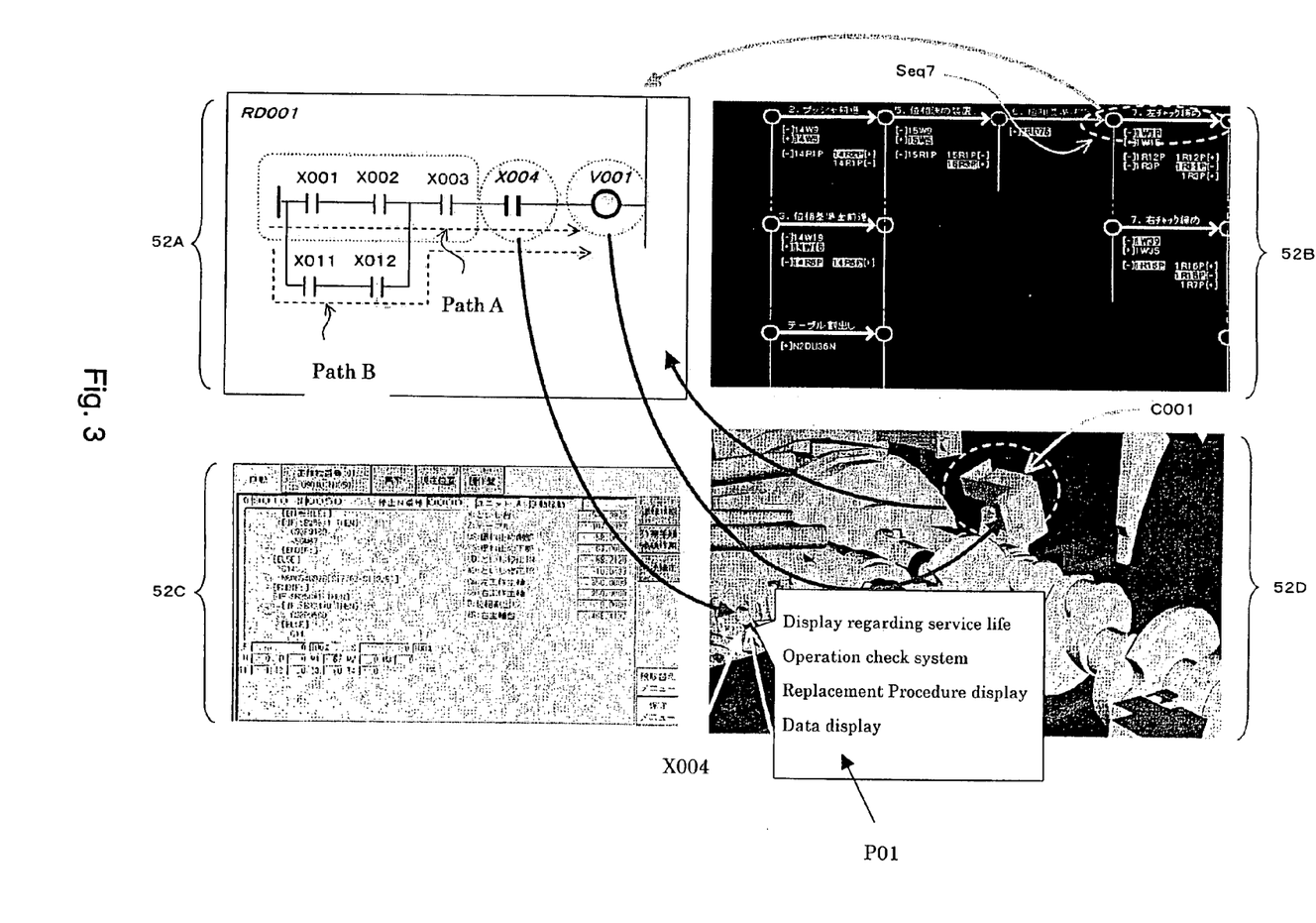
FIG. 3 is a screen image for explaining an example display on a monitor.

In the cycle diagram shown in the section 52B in FIG. 3, the order or sequence of respective steps is displayed, and a properly completed step(s) and a currently executed step(s)

are displayed such that these steps can be distinguished from the remaining steps (for example, the colors of these steps are changed or are flickered at different frequencies). The operator can grasp the progress of steps by viewing the cycle diagram.

In the section 52A in FIG. 3, for example, a ladder circuit corresponding to a step currently performed can be displayed.

Figure 4A:
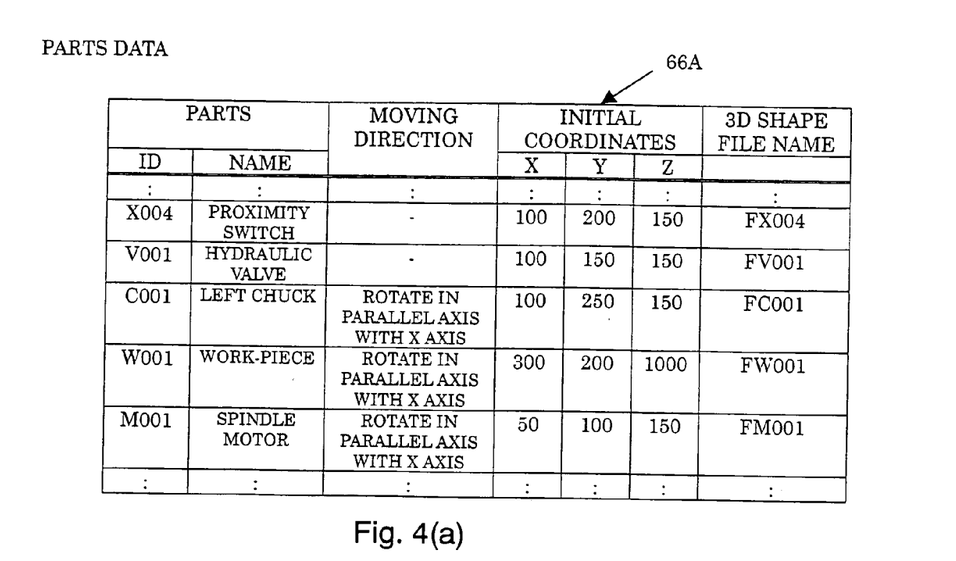
FIGS. 4A to 4C are tables showing parts data, moving parts relevant data, and relevant ladder data.

The storage means 66 stores relevant ladder data 66C (see FIG. 4C) relating a ladder circuit(s) to each step. In the example shown in FIG. 4C, ladder circuits "RD001" and "RD002" are related to a step for closing the left-hand chuck (step name: left chuck closing). In the case of the example shown in FIG. 3, one of the ladder circuits corresponding to the step for closing the left-hand chuck (Seq. 7) in the cycle diagram is the ladder circuit "RD001," and the ladder circuit "RD001" is a ladder circuit displayed in the section 52A of FIG. 3.

Notably, the control means may automatically display a ladder circuit(s) corresponding to the currently executed step or may display a ladder circuit(s) in accordance with a display instruction from the operator (e.g., when the operator selects a step from the cycle diagram).

Each ladder circuit is formed through series and/or parallel connection of elements including detection means. Notably, in some cases, the elements include not only the detection means, but also internal switches (which are not only physical switches but also flags which are set to "true (1)" or "false (0)" as a result of a predetermined condition determination performed by the control means).

The CPU 62 can determine an element(s) within the ladder circuit having completed operation (and an element(s) not having completed operation) on the basis of the detection signals from the detection means (when the detection means serves as an element). The machine tool control apparatus 50 of the present invention can display, in the displayed ladder circuit, an element(s) having completed operation (or an element(s) not having completed operation) in a distinguishable manner, irrespective of whether the element (s) is the detection means.

Therefore, the operator can easily grasp the progress of work (e.g., can know an element(s) whose operation end results in completion of the step) by viewing the states of the elements which are displayed in the ladder circuit in a distinguishable manner.

In the section 52D of FIG. 3, there is displayed a three-dimensional model of the machine tool which is operated in synchronism with actual operation of the controlled machine tool.

The storage means 66 stores parts data 66A for each of the parts (including moving parts) of the machine tool. The parts data 66A are stored in a file (three-dimensional shape file) and include data regarding a moving direction (for moving parts), initial coordinates, and a shape (see FIG. 4A).

Figure 4B:
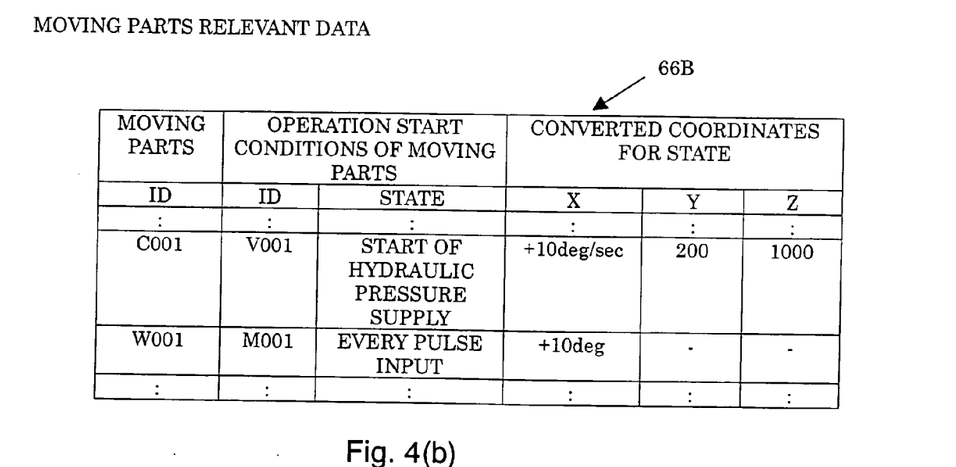
Figure 4C:
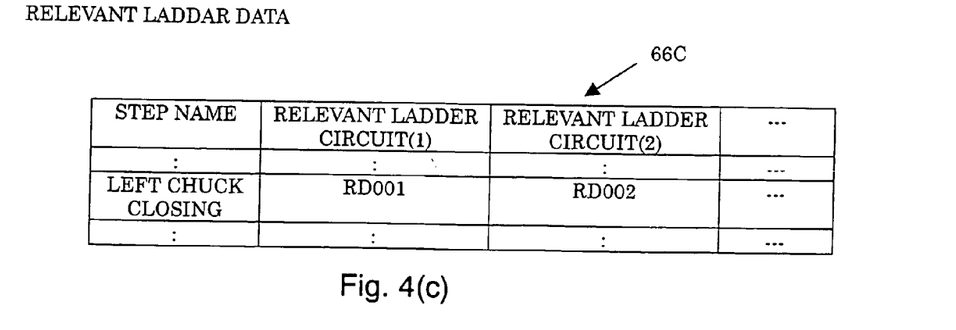

Further, the storage means 66 stores moving parts relevant data 66B for each moving part. The moving parts relevant data 66B include data representing the detection means capable of detecting the operation state of the moving part, and coordinates, etc., which determine the way of moving (operating) the moving part on the basis of the detection signal from the detection means.

Notably, in the moving parts relevant data 66B shown in FIG. 4B, a pulse input from a spindle motor M001 (pulse input from the encoder of the spindle motor M001) and a drive signal (hydraulic pressure supply signal) fed to a hydraulic valve V001 are handled as detection signals. Other detection signals include ON/OFF signals from limit switches and proximity switches.

The CPU 62 can determine, on the basis of the moving parts relevant data 66B and detection signals from the detection means, which moving part has moved to which location (coordinates) (whether operation has been completed), and can display the three-dimensional model through simulation on the basis of the result of the determination such that the three-dimensional model operates in synchronism with actual operation of the machine tool.

In the three-dimensional model, the color and transparency of a selected part can be changed, and the viewpoint location and magnification thereof can be freely changed. Accordingly, the operator can easily grasp the operation, shape, etc. of a part which is located behind a safety cover or frame of the machine tool body 1.

In the section 52C of FIG. 3, coordinates (a position represented by numerical values) of a selected moving part are displayed. The operator can know the precise location of the selected moving part.

[Example Display of the Monitor when the Machine Tool has Stopped because of Occurrence of an Abnormality (FIG. 3)]

The machine tool control apparatus 50 includes abnormality detection means, and the CPU 62 can determine, on the basis of detection signals, whether an abnormality has occurred in relation to operation of the machine tool. For examples, voltages output from the sizing devices 40A and 40B and corresponding to the diameters of the measured portions of the workpiece W are fed to the machine tool control apparatus 50 in which the fed voltages are subjected to AD conversion on the NC board (for input) 65 so as to obtain the diameters of the measured portions. Therefore, when a voltage falling outside the ordinary range is fed to the machine tool control apparatus 50, the machine tool control apparatus 50 can determine that an abnormality has occurred. Further, an abnormality determination time is set for each step. Therefore, in the case where a certain step does not end even when the abnormality determination time has elapsed after start of the step, the machine tool control apparatus 50 can determine that an abnormality has occurred.

Next, an example case in which an abnormality has occurred in the "left chuck closing step," which is one of the steps for attaching the workpiece W to the machine tool, will be described with reference to FIG. 3.

In the case where that step does not end even after the abnormality determination time set for that step has elapsed, the CPU 62 determines that an abnormality has occurred in the step, and stops the machine tool. Subsequently, the CPU 62 extracts, from the cycle diagram (section 52B of FIG. 3), the step which has been determined to have an abnormality (in this case, "left chuck closing step"), and displays the extracted step in the cycle diagram in a distinguishable manner (in a highlighted condition). Further, the CPU 62 extracts a ladder circuit corresponding to the step which has been determined to have an abnormality, and displays the ladder circuit. Notably, as shown in the relevant ladder data 66C (FIG. 4C), in some cases, two or more ladder circuits correspond to the step. However, since the CPU 62 determines the abnormality on the basis of the abnormality determination time, etc., the CPU 62 can specify the ladder circuit in which an abnormality has occurred.

In the ladder circuit shown in the section 52A of FIG. 3, when all the elements in path A or all the elements in path B complete their operations, an element V001 (in this case, a hydraulic valve) is driven so as to fix the workpiece W by means of a left-hand chuck C001.

Here, the ladder circuit shown in the section 52A of FIG. 3 is assumed to be in a state such that the elements X001, X002, and X003 have completed their operations, and the abnormality determination time has elapsed before the element X004 completes its operation.

In this case, the CPU 62 can determine that the operations of the elements X004 and V001 have not yet been completed. Thus, the CPU 62 displays the elements X004 and V001 not having completed their operations in a distinguishable manner (e.g., the CPU 62 changes their colors or flickering frequencies). Notably, the elements X001, X002, and X003 having completed their operations may be displayed in a distinguishable manner. In either case, the operator can properly distinguish the "elements not having completed their operations" from the "elements having completed their operations." Further, the CPU 62 can specify a detection means or a moving part which corresponds to the elements X004 and V001 not having completed their operations. For example, from the parts data 66A, the element X004 is found to be a detection means (proximity switch). Further, from the parts data 66B, the element V001 is found to be an element relating to C001 (left-hand chuck).

The CPU 62 then displays, in the displayed three-dimensional model, the specified detection means or moving part, in a distinguishable manner. Notably, the CPU 62 displays at least one of the element V001 and the moving part C001 in a distinguishable manner.

As described above, when the CPU 62 detects an abnormality in a certain step, the CPU 62 specifies, in a corresponding ladder circuit, a detection means or a moving part corresponding to an element not having completed its operation, and displays the specified detection means or moving part in the three-dimensional model in a distinguishable manner. Notably, display of the ladder circuit may be omitted; however, display of the ladder circuit enables the operator to know the details of the abnormality.

Next, the steps, starting from detection of an abnormality to display of a relevant element on the three-dimensional model, will be described successively. For example, when the proximity switch X004 becomes unable to operate because of stain by dust or the like to the sensor, the CPU 62 detects an abnormality in the "left chuck closing step" in the cycle diagram (52B), and then stops the machine tool (notably, the CPU 62 reports the stoppage to the operator (by means of, for example, turning an abnormality lamp on at the time of stoppage).

The CPU 62 displays the ladder circuit RD001 which corresponds to the "left chuck closing step" in the cycle diagram and which has been determined to be abnormal because of an operation failure of the proximity switch X004 (52A). Notably, the CPU 62 may be configured to display the ladder circuit when the operator selects the "left chuck closing step" in the cycle diagram, or to automatically display the ladder circuit.

In the displayed ladder circuit RD001, the elements X004 and V001 not having completed their operations are displayed in a highlighted condition (in a distinguishable manner). Subsequently, the CPU 62 specifies a detection means or a moving part corresponding to each of the elements X004 and V001 not having completed their operations (on the basis of the parts data 66A, the moving parts relevant data 66B, etc.), and displays it in the displayed three-dimensional model in a highlighted condition (in a distinguishable manner). In this case, the CPU 62 specifies the proximity switch X004 (the element X004 itself) for the element X004, and specifies the left-hand chuck C001 (a moving part driven by the element V001) for the element V001. Although not illustrated clearly in FIG. 3, the proximity switch X004 and the left-hand chuck C001 are displayed in the three-dimensional model (52D) in a distinguishable manner; i.e., with their colors or flickering frequencies being changed.

By viewing the three-dimensional model (52D), the operator can instantaneously grasp that the "left-hand chuck C001 has not yet closed" and that "an abnormality has occurred in relation to the proximity switch X004." Even when the operator does not know the structure of the machine tool very well, the operator can instantaneously grasp the position, shape, etc., of the proximity switch X004 from the displayed three-dimensional model, and can quickly find the actual proximity switch X004 of the machine tool so as to check the state thereof. The operator then finds stains by dust to the proximity switch X004, and removes the dust to thereby complete the recovery work.

[Other Displays]

The machine tool control apparatus 50 of the present embodiment has the following display functions which enable the operator to easily recover the machine tool from the abnormal state.

For example, when the operator selects the proximity switch X004 displayed in the three-dimensional model (52D) of FIG. 3 in a highlighted condition, a display menu P01 is displayed and enables the operator to select a data item regarding the part to be displayed.

When the operator selects "display regarding service life," for example, recommended residual use period, recommended replacement timing, etc., are displayed. In this case, data regarding the service life of each part are stored in the storage means 66, and every time the part is used (operated or the like), the number of times of use or accumulated use time is updated. On the basis of these data, the recommended residual use period, recommended replacement timing, etc., can be displayed.

When the operator selects "operation check display," a procedure (steps) for checking the operation of the relevant part is displayed in the form of a three-dimensional model or animation. Notably, in the case where the procedure is displayed by use of a three-dimensional model, the display conditions, such as viewpoint direction, magnification, or transparency of a designated part, can be changed. However, in the case where the procedure is displayed by use of animation, the display conditions cannot be changed, because fixed images are reproduced in animation.

By virtue of this display, the operator can easily find stains by dust to the relevant part as in the above-described example, or that the part is broken and must be replaced.

When the operator selects "replacement procedure display," a procedure for replacing the part is displayed in the form of a three-dimensional model or animation.

By virtue of this display, the operator can quickly complete the work of properly replacing the part.

Further, when the operator selects "specific data display," data (manufacturer, model number, properties, etc.) regarding the part are displayed.

Various other types of data can be stored and displayed while being related to parts.

[Example Display in an Ordinary State (FIG. 6)]

Displays at the time of occurrence of an abnormality have been described. Next, an example display in an ordinary state (at the time of normal operation) will be described with reference to FIG. 6.

Figure 6:
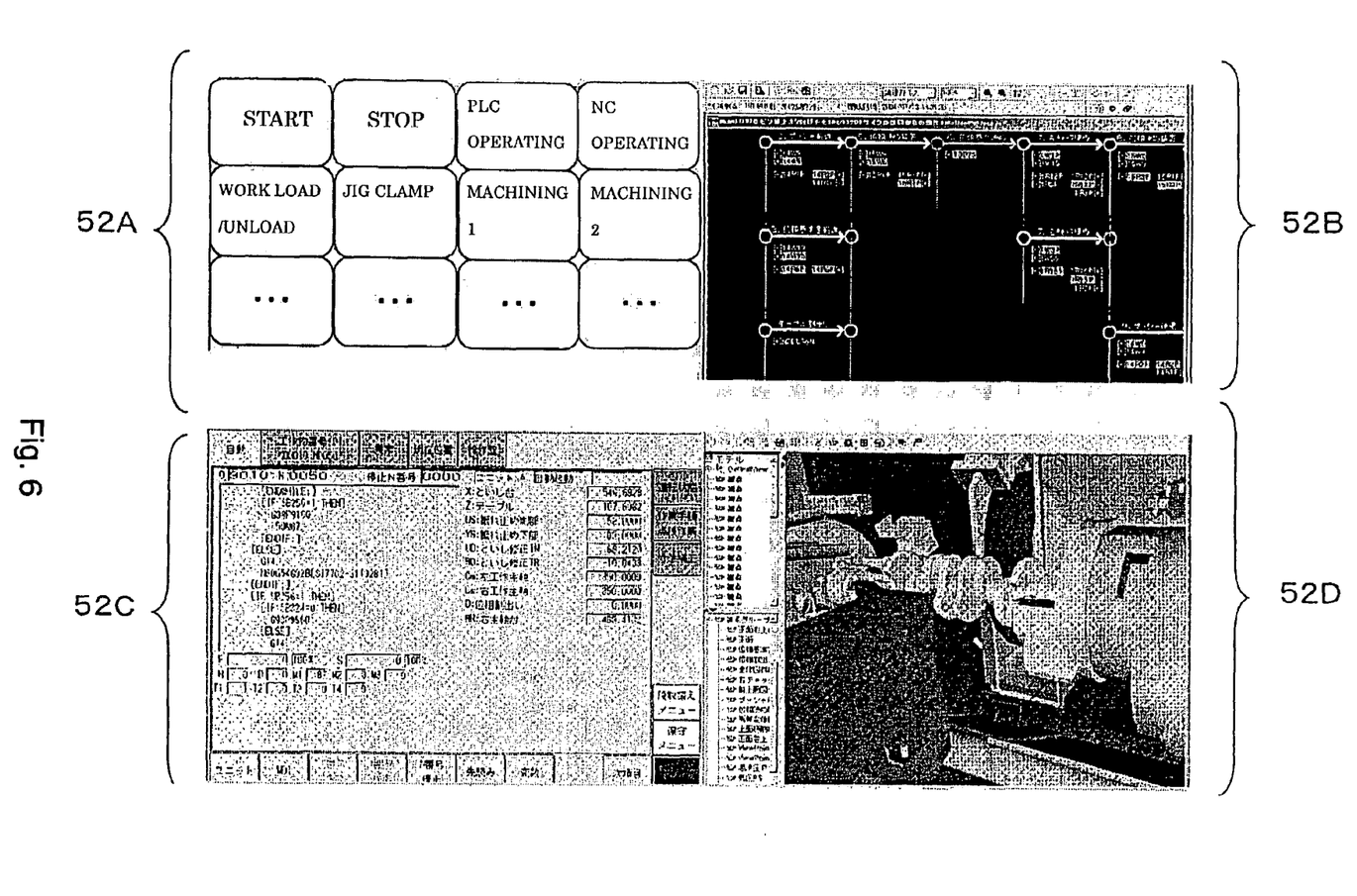
FIG. 6 is a screen image for explaining an example display at the ordinary time (at the time of normal operation)

As shown in FIG. 6, in an ordinary state, an operation screen is displayed in the section 52A in place of the ladder circuit. For example, the operation screen includes buttons marked "start," "stop," "(operation name)," etc., which are used to instruct operation of the machine tool. The operator can provide a desired instruction to the machine tool by operating the buttons.

[Example Operation Assist Screen (FIG. 7)]

Figure 7:
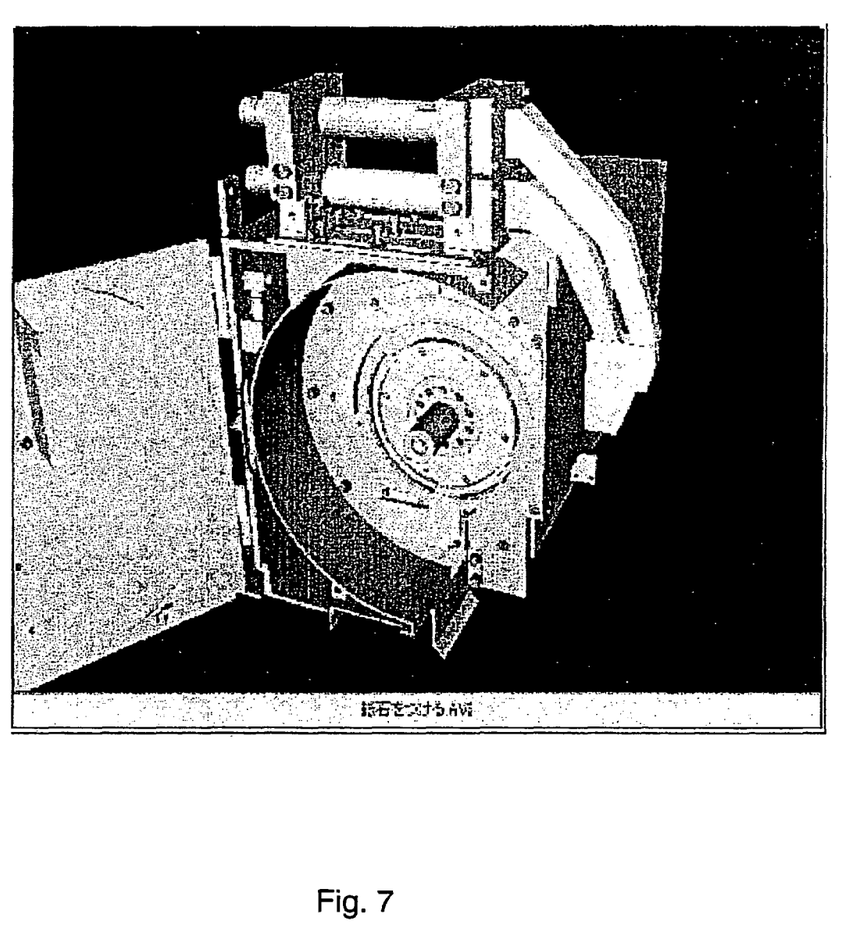
FIG. 7 is a screen image for explaining an example display at the time when "replacement procedure display" has been selected.

FIG. 7 shows an example display of a screen using three-dimensional graphics or three-dimensional animation for a work of replacing a tool, jig, or the like. Assisting the replacement work, etc. by the operator improves work efficiency, and reduces operation mistakes or simple mistakes.

This display is provided when the above-described "replacement procedure display" is selected. FIG. 7 shows an example display at the time of replacement of the grinding wheel.

The machine tool control apparatus 50 of the present invention is not limited to the structure, connections, processing steps, display method, etc., which have been described in relation to the present embodiment, and various modifications, additions, and deletions are possible without departing from the scope of the present invention.

The contents of part data 66A, the moving parts relevant data 66B, and the relevant ladder data 66C, the display screens (52A to 52D), etc., which have been described in relation to the present embodiment, are not limited to the description of the present embodiment.

The step sequence data is not limited to the cycle diagram in which step names are connected with one another by means of lines. The step names may be displayed in a row.

Numerical values, etc., used in the description of the present embodiment are mere examples, and the present invention is not limited to the numerical values, etc.

What is claimed is:

1. A machine tool control apparatus for a machine tool including a plurality of moving parts each provided with a detection means for detecting the operation state of the moving part, comprising:

control means for controlling the machine tool;

simulation means for operating a three-dimensional model of the machine tool in synchronism with operation of the machine tool;

storage means for storing step sequence data representing a sequence of operation steps, data representing ladder circuits related to the steps, each of the ladder circuits being configured by connecting elements, including the detection means, in series and/or parallel, and moving parts relevant data which relate each detection means to a moving part whose operation state is detected by the detection means;

display means for displaying at least the three-dimensional model of the machine tool operated through simulation, and the step sequence data; and abnormality detection means for detecting an abnormality having occurred in one of the operation steps, wherein the control means controls the machine tool in a sequence according to the step sequence data and the ladder circuits;

the control means can determine on the basis of a detection signal from each detection means whether an element corresponding to the detection means has completed its operation; and when the abnormality detection means detects an abnormality, the control means extracts, from a ladder circuit corresponding to a step in which an abnormality has been detected, an element to be operated in response to completion of operation of a preceding element in the ladder circuit, or an element not having completed its operation, specifies a detection means corresponding to the extracted element or a moving part corresponding to the detection means, and displays at least one of the specified detection means or moving part in the three-dimensional model displayed on the display means such that the detection means or moving part can be distinguished.

2. A machine tool control apparatus according to claim 1, wherein when the abnormality detection means detects an abnormality, the control means selects, on the basis of the step sequence data, a step in which an abnormality has been detected; displays a ladder circuit corresponding to the selected step; and displays in the displayed ladder circuit, an element having completed its operation or an element not having completed its operation in a distinguishable manner.

* * * * *